United States Patent
Li

(10) Patent No.: US 11,261,515 B2
(45) Date of Patent: Mar. 1, 2022

(54) METHOD FOR PRODUCING MEMBER FOR MOLTEN METAL BATH

(71) Applicant: NIPPON STEEL & SUMIKIN HARDFACING CO., LTD., Tokyo (JP)

(72) Inventor: Yu Li, Tokyo (JP)

(73) Assignee: NIPPON STEEL & SUMIKIN HARDFACING CO., LTD., Tokyo (JP)

( * ) Notice: Subject to any disclaimer, the term of this patent is extended or adjusted under 35 U.S.C. 154(b) by 344 days.

(21) Appl. No.: 16/099,349

(22) PCT Filed: Jul. 19, 2018

(86) PCT No.: PCT/JP2018/027146
§ 371 (c)(1),
(2) Date: Nov. 6, 2018

(87) PCT Pub. No.: WO2019/082458
PCT Pub. Date: May 2, 2019

(65) Prior Publication Data
US 2021/0010124 A1 Jan. 14, 2021

(30) Foreign Application Priority Data
Oct. 23, 2017 (WO) .................. PCT/JP2017/038187

(51) Int. Cl.
*C23C 18/02* (2006.01)
*C23C 4/18* (2006.01)
(Continued)

(52) U.S. Cl.
CPC .................. *C23C 4/18* (2013.01); *B05D 3/02* (2013.01); *B05D 7/52* (2013.01); *C23C 4/11* (2016.01); *C23C 18/02* (2013.01); *C23C 18/12* (2013.01)

(58) Field of Classification Search
CPC ........... C23C 4/18; C23C 18/02; C23C 18/12; B05D 3/02; B05D 7/52
See application file for complete search history.

(56) References Cited

U.S. PATENT DOCUMENTS 4,423,764 A * 1/1984 Seeney .................. B22C 1/185
164/520
5,736,255 A * 4/1998 Sasaki ...................... C03C 8/24
106/14.12
(Continued)

FOREIGN PATENT DOCUMENTS

| JP | H08-092719 A | 4/1996 |
| JP | H08-300133 A | 11/1996 |

(Continued)

OTHER PUBLICATIONS

PCT International Search Report of PCT/JP2018/027146 "PCT/ISA/210" in Japanese dated Sep. 25, 2018.
(Continued)

*Primary Examiner* — Nathan H Empie
(74) *Attorney, Agent, or Firm* — Manabu Kanesaka

(57) ABSTRACT

It is an object to provide a method for producing a member for a molten metal bath which is less likely to form minute cracks and pores in a pores-sealing coating film, and to provide a method for producing a member for a molten metal bath which can restrain adhesion of an alloy such as dross. The method for producing a member for a molten metal bath is characterized by applying or spraying, to a cermet thermal spray coating film formed on a base material or an oxide-based ceramic thermal spray coating film formed on a base material, a mixed solution obtained by adding aluminum dihydrogen phosphate and inorganic particles having a layered hexagonal crystal structure to a silica sol solution as a solution for sealing pores of the thermal (Continued)

spray coating film, and firing the mixed solution which is applied or sprayed to the thermal spray coating film.

10 Claims, 2 Drawing Sheets

(51) Int. Cl.
*C23C 4/11* (2016.01)
*B05D 3/02* (2006.01)
*B05D 7/00* (2006.01)
*C23C 18/12* (2006.01)

(56) References Cited

U.S. PATENT DOCUMENTS

| | | | |
|---|---|---|---|
| 6,051,058 A * | 4/2000 | Crisci | B22D 11/066 |
| | | | 106/38.22 |
| 6,284,320 B1 | 9/2001 | Tarumi et al. | |
| 6,284,682 B1 * | 9/2001 | Troczynski | C04B 35/624 |
| | | | 501/12 |

FOREIGN PATENT DOCUMENTS

| | | |
|---|---|---|
| JP | H10-045161 A | 2/1998 |
| JP | H10-071675 A | 3/1998 |
| JP | 2000-054095 A | 2/2000 |
| JP | 2000-096204 A | 4/2000 |

OTHER PUBLICATIONS

PCT Opinion of PCT/JP2018/027146 "PCT/ISA/237" in Japanese dated Sep. 14, 2018.
PCT/IB/338, "Notification of Transmittal of Translation of the International Preliminary Report on Patentability for International Application No. PCT/JP2018/027146," dated May 7, 2020.
PCT/IB/373, "International Preliminary Report on Patentability for International Application No. PCT/JP2018/027146," dated Apr. 28, 2020.
PCT/ISA/237, "Written Opinion of the International Searching Authority for International Application No. PCT/JP2018/027146," dated Sep. 25, 2018.

* cited by examiner

METHOD FOR PRODUCING MEMBER FOR MOLTEN METAL BATH

RELATED APPLICATIONS

The present application is National Phase of International Application No. PCT/JP2018/027146 filed Jul. 19, 2018, and claims priority from PCT Application No. PCT/JP2017/038187, filed Oct. 23, 2017, the disclosure of which is hereby incorporated by reference herein in its entirety.

TECHNICAL FIELD

The present invention relates to a method for producing a member for molten metal bath which is used in molten metal in a molten metal plating line.

BACKGROUND ART

Conventionally, in a plating bath arranged in a continuous hot-dip galvanizing line, a continuous hot-dip aluminum plating line or the like, members such as an in-bath roll and other incidental facilities are used. These members are used while being in contact with molten metal such as zinc or aluminum. Therefore, they react with the molten metal and are easy to corrode. For this reason, it is common to form a thermal spray coating film of cermet or ceramics, which has high corrosion resistance to molten metal, on the surface of the member.

If there are pores, cracks, or the like in the thermal spray coating film, molten metal may permeate into the thermal spray coating film and reach the base material inside the member. When the molten metal reaches the base material, the molten metal and the base material may react with each other and the thermal spray coating film may be destroyed at an early stage. Therefore, after the thermal spray coating film is formed, a pores-sealing process is performed on the pores and cracks of the thermal spray coating film (see, for example, Patent Literatures 1 to 4).

In a molten metal plating bath, iron eluted from a steel strip (steel plate) to be plated is bound to molten metal (e.g., zinc or aluminum) to generate dross (Fe—Al, Fe—Al—Zn intermetallic compound, etc.). The dross tends to wrap around in-bath rolls (sink rolls and support rolls), and the dross on the roll surface causes slip flaws, pushing flaws, and the like on the steel strip surface, causing quality deterioration. In order to solve the problem of dross wrapping, the in-bath roll needs not only to be hard to react with the molten metal in the bath, but also to prevent the dross from adhering to the roll.

CITATION LIST

Patent Literature

Patent Literature 1: JPH8-92719
Patent Literature 2: JPH10-71675
Patent Literature 3: JP2000-54095
Patent Literature 4: JP2000-96204

SUMMARY OF INVENTION

Technical Problem

In Patent Literatures 1 and 2, a mixture of ceramics such as a metal oxide, a nitride, a carbide, or a boride, and a binder solution containing a binder such as a silicate or a phosphate is applied to the surface of a thermal spray coating film and fired to form a pores-sealing layer on the surface of the thermal spray coating film. The formation of the pores-sealing layer fills the pores and cracks of the thermal spray coating film with ceramics to restrain permeation of molten metal into the thermal spray coating film. In Patent Literatures 1 and 2, a binder solution is used as a raw material for the pores-sealing layer. Therefore, the bonding between the ceramic particles can be strengthened. However, the solvent in the binder solution is evaporated by firing, and thus, the volume is reduced and minute cracks (hereinafter also referred to as "micro cracks") are generated in the pores-sealing layer. The molten metal thus reaches the pores and cracks of the thermal spray coating film through such micro cracks. Therefore, by this pores-sealing technique, permeation of molten metal into the thermal spray coating film cannot be restrained, and the thermal spray coating film may be destroyed.

Patent Literature 3 discloses a technique of filling pores and cracks of a thermal spray coating film with fired fine particles of a metal oxide or fired fine particles of a mixture of a metal oxide and a nitride with regard to a roll formed by coating a WC-Co cermet thermal spray coating film on a surface of a steel base material. In this technique, a metal salt aqueous solution or the like is applied to a thermal spray coating film and fired to form fired fine particles. However, since the solvent evaporates by firing the metal salt aqueous solution, gaps (i.e., pores) are formed between the resulting fired fine particles. The molten metal reaches the pores and cracks of the thermal spray coating film through the pores generated between the fired fine particles. Therefore, even in this pore-sealing technique, permeation of molten metal into the thermal spray coating film cannot be restrained, and the thermal spray coating film may be destroyed. In addition, the gas generated by evaporation of the solvent contained in the metal salt aqueous solution further enlarges the pores generated between the fired fine particles.

In Patent Literature 4, a mixed solution of a ceramic colloid such as $SiO_2$, $Al_2O_3$, $TiO_2$, $ZrO_2$, or the like and a phosphate solution is applied to the thermal spray coating film, and is fired to form a pores-sealing layer on the surface of the thermal spray coating film. The formation of the pores-sealing layer seals pores and cracks of the thermal spray coating film, and restrains permeation of molten metal into the thermal spray coating film. The ceramic colloid is fine. Therefore, the mixed solution of the ceramic colloid and the phosphate solution easily fills the pores and cracks of the thermal spray coating film. In addition, the mixed solution applied to the thermal spray coating film turns into a gel, and a durum pores-sealing layer can be formed on the thermal spray coating film by subsequent firing. However, in the mixed solution composed of the ceramic colloid and the phosphate solution, the solvent in the solution evaporates in the process from gelation to firing. When the solvent in the solution evaporates, volume shrinkage occurs as in the techniques of Patent Literatures 1 to 2, and micro cracks occur in the pores-sealing layer. That is, even with this pores-sealing technique, permeation of molten metal into the thermal spray coating film cannot be restrained, and the thermal spray coating film may be destroyed.

Further, as in Patent Literatures 1 to 4, when micro cracks or pores are formed in the pores-sealing layer, alloy nuclei may be generated inside of micro cracks or pores in the molten metal. The nucleation of the alloy causes the alloy to grow and adhere to the surface of the thermal spray coating film. Furthermore, the pores-sealing layer disclosed in Patent Literature 4 cannot greatly improve the adhesion of dross (e.g., Fe—Al, Fe—Al—Zn alloy) in the molten metal plating bath.

It is therefore an object of the present invention to provide a method for producing a member for a molten metal bath which is less likely to form minute cracks and pores in a pores-sealing coating film, and to provide a method for producing a member for a molten metal bath which can restrain adhesion of an alloy such as dross.

Solution to Problem

In order to solve the above-mentioned problems, a method for producing a member for a molten metal bath according to one aspect of the present invention is (1) a method for producing a member for a molten metal bath, including applying or spraying, to a cermet thermal spray coating film formed on a base material or an oxide-based ceramic thermal spray coating film formed on a base material, a mixed solution obtained by adding aluminum dihydrogen phosphate and inorganic particles having a layered hexagonal crystal structure to a silica sol solution as a solution for sealing pores of the thermal spray coating film, and firing the mixed solution which is applied or sprayed to the thermal spray coating film. According to the (1), the above-described object can be achieved.

(2) In the method for producing a member for a molten metal bath according to (1) described above, the method for producing a member for a molten metal bath is characterized in that the inorganic particles are hexagonal boron nitride.

(3) In the method for producing a member for a molten metal bath according to (1) or (2) described above, the method for producing a member for a molten metal bath is characterized in that aluminum dihydrogen phosphate is added in an amount of 10 parts by mass or more and 80 parts by mass or less to 100 parts by mass of silica contained in the silica sol solution.

(4) In the method for producing a member for a molten metal bath according to any one of (1) to (3) described above, the method for producing a member for a molten metal bath is characterized in that the inorganic particles are added in an amount of 2 parts by mass or more and 25 parts by mass or less to 100 parts by mass of the mixed solution.

(5) In the method for producing a member for a molten metal bath according to any one of (1) to (4) described above, the method for producing a member for a molten metal bath is characterized in that the inorganic particles have an average particle diameter of 0.1 µm or more and 5 µm or less.

(6) In the method for producing a member for a molten metal bath according to any one of (1) to (5) described above, the method for producing a member for a molten metal bath is characterized in that the cermet thermal spray coating film is any of a WC-WB-Co-based cermet thermal spray coating film, a WB-Co-based cermet thermal spray coating film, and a WC-Co-based cermet thermal spray coating film.

(7) In the method for producing a member for a molten metal bath according to any one of (1) to (6) described above, the method for producing a member for a molten metal bath is characterized in that the oxide-based ceramic thermal spray coating film is a thermal spray coating film of an oxide of at least one element selected from the group consisting of Y, Ce, Er, Zr, and Cr.

Advantageous Effects of Invention

According to the present invention, there can be provided a method for producing a member for a molten metal bath which is less likely to form minute cracks and pores in a pores-sealing coating film, and to provide a method for producing a member for a molten metal bath which can restrain adhesion of an alloy such as dross.

DESCRIPTION OF EMBODIMENTS

Figure 1:
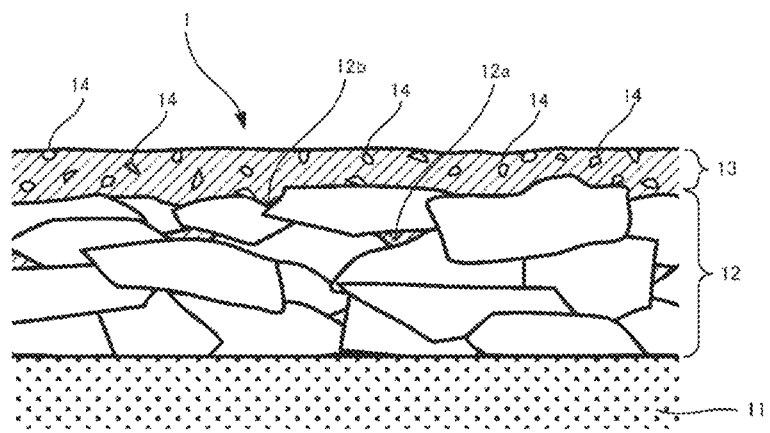
FIG. 1 is a schematic cross-sectional view of a member for a molten metal bath, having a pores-sealing coating film formed thereon.

Hereinafter, configurations for implementing the present invention will be described. FIG. 1 is a schematic view of a cross section of a member for a molten metal bath 1, having a pores-sealing coating film 13 formed thereon according to this embodiment.

The member for a molten metal bath 1 of this embodiment is a member used as an in-bath roll or other incidental equipment in a plating bath arranged in a hot-dip galvanizing line, a hot-dip aluminum plating line or the like. The member for a molten metal bath 1 is used while being in contact with a molten metal (such as zinc or aluminum). As shown in FIG. 1, the member for a molten metal bath 1 of this embodiment is produced by forming a thermal spray coating film 12 on a base material 11 of the member for a molten metal bath 1 and performing a pores-sealing treatment on the thermal spray coating film 12 to form a pores-sealing coating film 13.

The thermal spray coating film 12 formed on (the surface of) the base material 11 is a cermet thermal spray coating film or an oxide-based ceramic thermal spray coating film. In this embodiment, the following processes are performed as a pores-sealing treatment of pores 12a and cracks 12b formed in the thermal spray coating film 12. A mixed solution in which aluminum dihydrogen phosphate and inorganic particles 14 having a layered hexagonal crystal structure are added to a silica sol solution (hereinafter, also simply referred to as a "mixed solution") is applied or sprayed onto the surface of the thermal spray coating film 12, and fired to form the pores-sealing coating film 13.

The mixed solution gels by the reaction of aluminum dihydrogen phosphate and the silica sol solution, and is fired to form a glassy pores-sealing material. The glassy pores-sealing material obtained by firing the mixed solution has a property of being less likely to react with the molten metal and preventing the molten metal from permeating thereinto. The mixed solution is first applied or sprayed to the surface of the thermal spray coating film 12 on the base material 11, covers the thermal spray coating film 12, and permeates into the pores 12a and the cracks 12b. Then, firing of the mixed solution forms a pores-sealing coating film 13 containing a glassy pores-sealing material, so that the pores 12a and the cracks 12b are sealed. In this description, the "sol" refers to a state in which the dispersion medium containing colloidal particles has fluidity, and the "gel" refers to a state in which the dispersion medium containing colloidal particles has lost fluidity. Further, the "gelation" means that the dispersion medium containing colloidal particles changes from a fluidity state to a fluidity-lost state.

The silica sol solution is a sol solution in which colloidal particles made of silica ($SiO_2$) and/or hydrates thereof (hereinafter, also referred to as "silica colloidal particles") are dispersed in a dispersion medium, and is used to obtain properties of hardly reacting with molten metal such as a Zn alloy. When a silica sol solution is used as a raw material of the pores-sealing coating film 13, a glassy pores-sealing material which is less likely to react with molten metal such as a Zn alloy is formed. The silica sol solution can be produced by any publicly known method, and for example, can be obtained by mixing a silicate (e.g., sodium silicate) with dilute hydrochloric acid and dialyzing the resulting mixture.

The mass fraction of the silica ($SiO_2$) in the silica sol solution is preferably 20% or more and 45% or less. If the mass fraction exceeds 45%, the viscosity of the solution becomes high, and the handling of the solution becomes difficult during the process of mixing with aluminum dihydrogen phosphate and the inorganic particles 14. If the mass fraction is less than 20%, the amount of silica ($SiO_2$) for filling the pores 12a and the cracks 12b of the thermal spray coating film 12 becomes small, and the number of times for applying or spraying the above-described mixed solution to the thermal spray coating film 12 increases, which may cause trouble.

The silica colloidal particles contained in the silica sol solution preferably have an average particle diameter of 50 nm or less. If the average particle diameter is larger than 50 nm, the silica colloidal particles are less likely to fill the pores 12a and the cracks 12b of the thermal spray coating film 12. The lower limit value of the average particle diameter is not particularly limited, but may be, for example, 10 nm. That is, the silica colloidal particles preferably have an average particle diameter of 10 nm or more and 50 nm or less. In this description, the "average particle diameter" means, unless otherwise specified, a particle diameter at an integrated value of 50% in a particle size distribution measured by a particle size distribution measuring apparatus based on a laser scattering/diffraction method, that is, a 50% volume average particle diameter (median diameter, d50). The viscosity of the silica sol solution is preferably 6.0 mPa·s or less. If the viscosity is larger than 6.0 mPa·s, the mixed solution is less likely to fill the pores 12a and the cracks 12b of the thermal spray coating film 12.

Aluminum dihydrogen phosphate ($Al(H_2PO_4)_3$) is added to the silica sol solution as a gelation initiator. Aluminum dihydrogen phosphate may be mixed with a solvent such as water and then added to the silica sol solution as an aluminum dihydrogen phosphate solution. Phosphoric acid may be added to the aluminum dihydrogen phosphate solution. Aluminum dihydrogen phosphate reacts with the silica sol solution to gel the mixed solution. The gelation of the mixed solution facilitates the retention of the mixed solution on the surface of the thermal spray coating film 12. Therefore, in a state where the pores 12a and the cracks 12b of the thermal spray coating film 12 are filled with the mixed solution, the firing treatment can be facilitated. Therefore, the pores 12a and the cracks 12b of the thermal spray coating film 12 are easily sealed by the pores-sealing coating film 13. The amount of aluminum dihydrogen phosphate to be added to the silica sol solution is not particularly limited. However, for example, when the total amount of aluminum dihydrogen phosphate and the silica sol solution (when the aluminum dihydrogen phosphate solution is used, the total amount of the aluminum dihydrogen phosphate solution and the silica sol solution) is 100 parts by mass, the total amount of aluminum dihydrogen phosphate and silica ($SiO_2$) is 10 parts by mass or more and 60 parts by mass or less.

The mixed solution in which aluminum dihydrogen phosphate is added to the silica sol solution may be applied or sprayed to the thermal spray coating film 12 after the gel state is reached, or may be applied or sprayed to the thermal spray coating film 12 in a state in which gelation is progressing (or in a sol state). The mixed solution in a state in which gelation is progressing is easily applied or sprayed to the thermal spray coating film 12 and easily fill the pores 12a and the cracks 12b of the thermal spray coating film 12 as compared with the mixed solution in a gel state. For this reason, it is preferable that the mixed solution be applied or sprayed to the thermal spray coating film 12 in a state where gelation is progressing. Further, the mixed solution applied or sprayed to the thermal spray coating film 12 may be fired after the gel state is reached or may be fired in a state in which gelation is progressing. However, from the viewpoint of easily maintaining the state in which the pores 12a and the cracks 12b of the thermal spray coating film 12 are filled with the mixed solution, it is preferable that the mixed solution is fired after the gel state is reached.

Aluminum dihydrogen phosphate causes crystal transition of silica contained in the silica colloidal particles by firing the mixed solution. When the crystal transition of silica occurs, colloidal particles contained in the mixed solution are strongly bound to each other, and the bound colloidal particles are hardened. As a result, a glassy pores-sealing material covering the thermal spray coating film 12 is formed.

In the pores-sealing coating film 13, the inorganic particles 14 are retained in a dispersed state in the glassy pores-sealing material. That is, in the pores-sealing coating film 13, the space between the inorganic particles 14 is filled with a glassy pores-sealing material. Therefore, pores (gaps) are less likely to be formed in the pores-sealing coating film 13. On the other hand, if a solution in which only silica is dispersed (the solution is a solution in which silica does not form colloidal particles) is used instead of the silica sol solution, or if a solution in which only silicate ions are dispersed is used instead of the silica sol solution, a glassy pores-sealing material is less likely to be formed. Then, particles composed of silica, the inorganic particles 14, and fired particles thereof are deposited on the surface of the thermal spray coating film 12. In such the pores-sealing coating film formed by precipitating such particles, pores (gaps) are formed between the particles.

In this embodiment, the mixture ratio of the silica sol solution and aluminum dihydrogen phosphate is preferably set such that aluminum dihydrogen phosphate is added to be 10 parts by mass or more and 80 parts by mass or less with respect to the 100 parts by mass of the silica ($SiO_2$) in the silica sol solution, and more preferably set such that aluminum dihydrogen phosphate is added so that the mixture ratio is 20 parts by mass or more and 80 parts by mass or less. If aluminum dihydrogen phosphate is added in an amount of less than 10 parts by mass, gelation of the mixed solution may be less likely to occur. Thus, it may be difficult for the mixed solution to be retained on the surface of the thermal spray coating film 12. If aluminum dihydrogen phosphate is added in an amount of less than 10 parts by mass, the crystal transition of silica may be less likely to occur. Thus, the formation of a glassy pores-sealing material may be less likely to occur. For these reasons, the pores-sealing coating film 13 may react with the molten metal to facilitate adhesion of an alloy such as dross, or the molten metal may easily permeate the pores-sealing coating film 13. If aluminum dihydrogen phosphate is added in an amount of more than 80 parts by mass, the gelation rate of the mixed solution is easily increased, and the mixed solution easily becomes a gel state before the mixed solution is applied or sprayed onto the thermal spray coating film 12. For these reasons, the mixed solution may be less likely to fill the pores 12a and the cracks 12b of the thermal spray coating film 12. If aluminum dihydrogen phosphate is added in an amount of more than 80 parts by mass, aluminum dihydrogen phosphate may form pores in the pores-sealing coating film 13 in the firing process.

In this embodiment, the inorganic particles 14 having a layered hexagonal crystal structure are added to the silica sol solution together with aluminum dihydrogen phosphate. The layered hexagonal crystal structure is a crystal structure in which a large number of six-membered rings formed by covalently binding elements constituting the inorganic particles 14 are bound to form a two-dimensional structure (layer) and a large number of the two-dimensional structures (layers) are laminated to form the structure, and the layers are bound to each other by a weak van der Waals force. The inorganic particles 14 having a layered hexagonal crystal structure restrain shrinkage of the mixed solution in a plane in which each layer spreads in the crystal structure. That is, the inorganic particles 14 can prevent the movement of the liquid phase like a pin in the process of gelling or firing the mixed solution, and can restrain the reduction of the volume of the mixed solution (hereinafter also referred to as "pinning effect"). Therefore, the occurrence of minute cracks (hereinafter referred to as "micro cracks") caused by volume shrinkage can be restrained. When the inorganic particles 14 are not present in the mixed solution, the volume reduction caused during gelation or the firing process of the mixed solution is difficult to restrain, so that many micro cracks are generated in the pores-sealing coating film 13. In this description, the "micro crack" means a minute crack having a total length of 10 μm or less appearing on the surface of the pores-sealing coating film 13.

Further, in the crystal structure of the inorganic particles 14, since the layers are bound to each other by a weak van der Waals force, the inorganic particles 14 easily slip between the layers at the atomic level or cleave at the atomic level. In this embodiment, since the inorganic particles 14 are contained in the pores-sealing coating film 13, when an alloy such as dross adheres to the pores-sealing coating film 13, slippage or cleavage between the layers in the inorganic particles 14 contained in the pores-sealing coating film 13 occurs to shift the layers. The shifted layer is peeled off from the pores-sealing coating film 13 together with the alloy such as dross, or peeled off from the pores-sealing coating film 13 together with a part of the pores-sealing coating film 13 to which the alloy such as dross adheres. Therefore, adhesion of an alloy such as dross to the pores-sealing coating film 13 (the thermal spray coating film 12) can be restrained. Even if the pores-sealing coating film 13 is maintained with a dross attached thereto, it can be easily removed. The "dross" refers to an intermetallic compound formed by the reaction of Fe eluted from a steel strip (steel plate) to be plated into a plating bath with molten metal (for example, Al or zinc) in the bath. The dross is, for example, a Fe—Al-based or a Fe—Al-Zn-based intermetallic compound.

The inorganic particles 14 are not particularly limited as long as they have a layered hexagonal crystal structure.

Specific examples of the inorganic particles 14 may include graphite, hexagonal boron nitride (h-BN), and molybdenum disulfide ($MoS_2$), and combinations of two or more kinds thereof may be used. Among these inorganic particles 14, graphite and hexagonal boron nitride (h-BN) are more preferable because graphite and hexagonal boron nitride (h-BN) are less likely to react with molten metal as compared with molybdenum disulfide ($MoS_2$). Of graphite and hexagonal boron nitride (h-BN), hexagonal boron nitride (h-BN) is particularly preferable because it is less likely to react with molten metal as compared with graphite.

The inorganic particles 14 having a layered hexagonal crystal structure preferably have an average particle diameter of 0.1 μm or more and 5 μm or less, and more preferably 1 μm or more and 3 μm or less. When the average particle diameter falls within this range, the inorganic particles 14 can enter the pores 12a and the cracks 12b of the thermal spray coating film 12 (which means excellent filling property), and sufficient film forming property of the sealing coating 13 can also be obtained. If the average particle diameter of the inorganic particles 14 is larger than 5 μm, the film forming property is lowered and the pores-sealing coating film 13 easily deteriorate, and part of the pores-sealing coating film 13 may easily drop off. If the average particle diameter is less than 0.1 μm, the pinning effect tends to be insufficient, and the effect of restraining micro-cracking of the pores-sealing coating film 13 may not be sufficient.

The inorganic particles 14 having a layered hexagonal crystal structure are preferably added at a fraction (ratio) of 2 parts by mass or more and 25 parts by mass or less to 100 parts by mass of the mixed solution. When the amount falls within this range, a pinning effect that restrains micro-cracking of the pores-sealing coating film 13 during gelation and firing process of the mixed solution is reliably obtained, which is thus preferable. If the inorganic particles 14 are added in an amount of less than 2 parts by mass, the volume ratio of the inorganic particles 14 in the pores-sealing coating film 13 is small, and it is difficult to obtain a pinning effect for restraining micro-cracking. If the inorganic particles 14 are added in an amount of more than 25 parts by mass, pores (gaps) tend to be generated between the inorganic particles 14, and/or the strength of the pores-sealing coating film 13 is lowered, so that part of the pores-sealing coating film 13 tends to drop off. Further, it is particularly preferable that the inorganic particles 14 are added in a fraction (ratio) of 2 parts by mass or more and 10 parts by mass or less to 100 parts by mass of the mixed solution. When the inorganic particles 14 are added within the above range (2 parts by mass or more and 10 parts by mass or less), the pinning effect is more easily obtained reliably and micro cracks are less likely to be formed, as compared with the case where the inorganic particles 14 are added in an amount of less than 2 parts by mass. When the inorganic particles 14 are added within the above range (2 parts by mass or more and 10 parts by mass or less), the strength of the pores-sealing coating film 13 can be maintained in an improved state as compared with the case where more than 10 parts by mass of the inorganic particles 14 are added, and the dropping-off of the pores-sealing coating film 13 can thus be restrained for a longer period of time. Therefore, when the inorganic particles 14 are added within the above range (2 parts by mass or more and 10 parts by mass or less), the molten metal is less likely to permeate into the inside of the thermal spray coating film 12 or the pores-sealing coating film 13 through the dropping-off portion of the pores-sealing coating film 13, and it is possible to restrain permeation of the molten metal into the inside of the thermal spray coating film 12 or the sealing coating 13 for a longer period of time.

The average thickness of the pores-sealing coating film 13 is preferably 5 µm or more and 25 µm or less, and more preferably 10 µm or more and 15 µm or less. When the average thickness falls within this range (5 µm or more and 25 µm or less), the inorganic particles 14 having a layered hexagonal crystal structure are dispersed in the pores-sealing coating film 13 and a pinning effect can be obtained uniformly in the pores-sealing coating film (mixed solution) 13, which is thus preferable. If the thickness of the pores-sealing coating film 13 is less than 5 µm, the dispersibility of the inorganic particles 14 is lowered, and the pinning effect is varied, so that micro-cracking may be likely to occur. If the thickness of the pores-sealing coating film 13 exceeds 25 µm, part of the pores-sealing coating film 13 may drop off due to an external force such as an impact or the like. In this description, the average thickness refers to a value obtained by measuring the thickness of the coating film at five or more different points using a scanning electron microscope (SEM) and averaging the obtained values.

The base material 11 is not particularly limited as long as it is formed of a material capable of forming the thermal spray coating film 12. The base material 11 may be appropriately selected according to use applications of the member for a molten metal bath 1. For example, when the member for a molten metal bath 1 is used as an in-bath roll, the base material 11 may be formed of heat resistant steel having a coefficient of thermal expansion of $16 \times 10^{-6}$/k or less.

The thermal spray coating film 12 is a cermet thermal spray coating film or an oxide-based ceramic thermal spray coating film. As the cermet thermal spray coating film, for example, a WC-WB-Co-based cermet thermal spray coating film obtained by thermally spraying WC, WB, Co, WCoB and $W_2CoB_2$ onto the base material 11, a WB-Co-based cermet thermal spray coating film obtained by thermally spraying WB, Co, WCoB and $W_2CoB_2$ onto the base material 11, and a WC-Co-based cermet thermal spray coating film obtained by thermally spraying WC, $W_2C$ and Co onto the base material 11 may be used. As the oxide-based ceramic thermal spray coating film, for example, a thermal spray coating film obtained by thermally spraying one or more oxides selected from Y, Ce, Er, Zr, and Cr may be mentioned. Since the thermal spray coating film 12 is a cermet thermal spray coating film or an oxide-based ceramic thermal spray coating film, the pores-sealing coating film 13 comes into close contact with the thermal spray coating film 12, and is less likely to drop off from the thermal spray coating film 12. If the thermal spray coating film 12 is not a cermet thermal spray coating film or an oxide-based ceramic thermal spray coating film, the pores-sealing coating film 13 tends to drop off from the thermal spray coating film 12. As a method for forming the thermal spray coating film 12 on the base material 11, a conventionally known method can be used. The average thickness of the thermal spray coating film 12 may be, for example, 30 µm to 300 µm.

Next, the method for producing the member for a molten metal bath 1 of this embodiment will be described in more detail. First, cermet thermal spraying or oxide-based ceramic thermal spraying is performed on the surface of a base material 11 (matrix) of an in-bath roll or other incidental equipment to form a thermal spray coating film 12. A mixed solution in which aluminum dihydrogen phosphate and the inorganic particles 14 having a crystal structure of a layered hexagonal crystal structure are added to a silica sol solution is applied or sprayed on the surface of the formed thermal spray coating film 12.

In the method for preparing the mixed solution, the above-described aluminum dihydrogen phosphate (or aluminum dihydrogen phosphate solution) and the above-described inorganic particles 14 are added to the silica sol solution satisfying the above-described conditions. When the inorganic particles 14 are added after aluminum dihydrogen phosphate (or aluminum dihydrogen phosphate solution) is added to the silica sol solution, the inorganic particles 14 may be added after the silica sol solution becomes a gel state, or may be added before the silica sol solution becomes a gel state (i.e., in a sol state where gelation is progressing). However, when the inorganic particles 14 are added before the silica sol solution becomes a gel state, the inorganic particles 14 are more easily dispersed in the silica sol solution than when the inorganic particles 14 are added after the silica sol solution becomes a gel state. Therefore, it is preferable that the inorganic particles 14 be added before the silica sol solution becomes a gel state. Aluminum dihydrogen phosphate may be added in a predetermined amount so as to satisfy the above-mentioned ratio in terms of the solid content of the silica sol solution. The inorganic particles 14 can also be added in a predetermined amount so as to satisfy the above-mentioned ratio with respect to the mixed solution of the silica sol and aluminum dihydrogen phosphate. The mixed solution is then stirred for 30 minutes or longer using a magnetic stirrer or the like to prepare a uniform mixed solution.

Next, the mixed solution is applied onto the thermal spray coating film 12 of the base material 11. The application method is not particularly limited, but a spray application method, a brush application method, a solution impregnation method, or the like is preferable. A spray application method is more preferable from the viewpoint of less coating unevenness and easy control of film thickness.

After application of the mixed solution to the thermal spray coating film 12, a firing treatment is performed using an electric furnace or the like to form a pores-sealing coating film 13 on the surface of the thermal spray coating film 12. The conditions of the firing treatment can be, for example, a firing temperature of 380 to 480° C. and a firing time of 3 hours. The above procedure is the method for producing the member for a molten metal bath 1 of this embodiment.

According to this embodiment described above, firing of the mixed solution applied to the thermal spray coating film 12 can form the pores-sealing coating film 13 that seals the pores 12a and the cracks 12b of the thermal spray coating film 12. In addition, since the space between the inorganic particles 14 contained in the pores-sealing coating film 13 is filled with the glassy pores-sealing material, pores (gaps) are less likely to be generated in the pores-sealing coating film 13. Further, since the reduction of the volume of the mixed solution is restrained by the inorganic particles 14 having a layered hexagonal crystal structure of a layered structure, the occurrence of micro cracks in the pores-sealing coating film 13 can be restrained. In addition, by restraining the occurrence of micro-cracks and pores in the pores-sealing coating film 13, the molten metal can be prevented from reaching the pores 12a and cracks 12b of the thermal spray coating film 12 through the micro cracks and pores of the pores-sealing coating film 13. That is, the member for a molten metal bath 1 has excellent resistance to permeation of molten metal (a property of restraining permeation of the molten metal into the inside of the thermal spray coating film 12), and can restrain the molten metal and the base material 11 from reacting with each other to break the thermal spray coating film 12.

Further, the glassy pores-sealing material constituting the pores-sealing coating film 13 is less likely to react with the molten metal, and the alloy such as dross is less likely to adhere thereto. Further, in the member for a molten metal bath 1 obtained by the production method of this embodiment, since micro cracks and pores are less likely to be formed in the pores-sealing coating film 13, it is possible to restrain the generation of alloy nuclei inside the micro cracks and pores. Therefore, the alloy generated by growing from the nucleus can be prevented from adhering to the member for a molten metal bath 1. Since the inorganic particles 14 having a layered hexagonal crystal structure of a layered structure are dispersed in the pores-sealing coating film 13, the adhesion of an alloy such as dross to the pores-sealing coating film 13 can be restrained. Even when an alloy such as dross adheres to the pores-sealing coating film 13 and is retained, it can be easily removed. This is because, in the inorganic particles 14 having a layered hexagonal crystal structure, the binding force between the layers of the layered structure is very weak, so that even when an alloy such as dross adheres, slippage occurs between the layers of the inorganic particles 14, and the alloy such as dross is easily peeled off from the pores-sealing coating film 13 together with the shifted layer of the inorganic particles 14. Therefore, according to this embodiment, it is possible to provide a excellent member for a molten metal bath 1 to which an alloy such as dross is less likely to adhere (less likely to wrap) and from which the attached alloy such as dross can be easily removed.

EXAMPLE

The present invention will next be more specifically described with reference to Examples. However, the present invention is not limited to these Examples any more.

A thermal spray coating film was formed on the surface of a base material (matrix), and a pores-sealing coating film described in the embodiment was actually produced on the surface of the thermal spray coating film, and the evaluations of the pores-sealing coating film were performed. Respective examples and comparative examples will be described.

Example 1

100 g of a silica sol solution containing 40 g of silica ($SiO_2$) (high-purity reagent manufactured by Nissan Chemical Corporation) was prepared. 35 g of an aluminum dihydrogen phosphate solution (high-purity reagent, manufactured by Taki Chemical Co., Ltd.) which was a mixture of 25 g of water and 10 g of aluminum dihydrogen phosphate ($Al(H_2PO_4)_3$) was prepared. To 100 g of the silica sol solution, 35 g of the aluminum dihydrogen phosphate solution was added, and 6.25 g of hexagonal boron nitride (h-BN) (high-purity reagent manufactured by Alfa Aesar, A Johnson Matthey Company) was added as inorganic particles having a layered hexagonal crystal structure. The silica sol solution to which the aluminum dihydrogen phosphate solution and hexagonal boron nitride had been added was stirred with a magnetic stirrer for 30 minutes to produce a pores-sealing solution (mixed solution). The mean particle diameter (median diameter) of h-BN was 2 µm.

A WC-WB-Co-based cermet thermal spray coating film was formed on the surface of the base material by thermally spraying cermet on a base material of a round bar made of SUS316L steel having a diameter of 30 mm and a length of 200 mm. The pores-sealing solution was applied by spraying on the surface of the thermal spray coating film to obtain a base material having the pores-sealing solution applied on the thermal spray coating film. The obtained base material was dried at room temperature, then placed in an electric furnace, and fired at 410° C. for 3 hours to obtain a member for a molten metal bath having a pores-sealing coating film formed on the thermal spray coating film. The application of the pores-sealing solution to the base material was performed at a coating amount of 15 g/min with a distance from the discharge port of the spray to the thermal spray coating film of 400 mm. The average thickness of the pores-sealing coating film was 10 µm.

Example 2

100 g of a silica sol solution containing 45 g of silica ($SiO_2$) (high-purity reagent manufactured by Nissan Chemical Corporation) was prepared. 20 g of an aluminum dihydrogen phosphate solution (high-purity reagent, manufactured by Taki Chemical Co., Ltd.) which was a mixture of 10 g of water and 10 g of aluminum dihydrogen phosphate ($Al(H_2PO_4)_3$) was prepared. To 100 g of the silica sol solution, 20 g of the aluminum dihydrogen phosphate solution was added, and 6.25 g of graphite (manufactured by FUJIFILM Wako Pure Chemical Corporation) was added as inorganic particles having a layered hexagonal crystal structure. The silica sol solution to which the aluminum dihydrogen phosphate solution and graphite had been added was stirred with a magnetic stirrer for 30 minutes to produce a pores-sealing solution (mixed solution). A member for a molten metal bath of Example 2 was obtained in the same methods as those in Example 1 except that this pores-sealing solution was used. The mean particle diameter (median diameter) of graphite was 2 µm. The average thickness of the pores-sealing coating film was 10 µm.

Example 3

100 g of a silica sol solution containing 30 g of silica ($SiO_2$) (high-purity reagent manufactured by Nissan Chemical Corporation) was prepared. 25 of an aluminum dihydrogen phosphate solution (high-purity reagent, manufactured by Taki Chemical Co., Ltd.) which was a mixture of 15 g of water and 10 g of aluminum dihydrogen phosphate (Al ($H_2PO_4)_3$) was prepared. To 100 g of the silica sol solution, 25 g of the aluminum dihydrogen phosphate solution was added, and 6.25 g of molybdenum disulfide ($MoS_2$ (manufactured by FUJIFILM Wako Pure Chemical Corporation)) was added as inorganic particles having a layered hexagonal crystal structure. The silica sol solution to which the aluminum dihydrogen phosphate solution and molybdenum disulfide ($MoS_2$) had been added was stirred with a magnetic stirrer for 30 minutes to produce a pores-sealing solution (mixed solution). A member for a molten metal bath of Example 3 was obtained in the same methods as those in Example 1 except that this pores-sealing solution was used. The mean particle diameter (median diameter) of molybdenum disulfide ($MoS_2$) was 2 µm. The average thickness of the pores-sealing coating film was 10 µm.

Example 4

100 g of a silica sol solution containing 25 g of silica ($SiO_2$) (high-purity reagent manufactured by Nissan Chemical Corporation) was prepared. 27 g of an aluminum dihydrogen phosphate solution (high-purity reagent, manufactured by Taki Chemical Co., Ltd.) which was a mixture of 17 g of water and 10 g of aluminum dihydrogen phosphate ($Al(H_2PO_4)_3$) was prepared. To 100 g of the silica sol solution, 27 g of the aluminum dihydrogen phosphate solution was added, and 12.5 g of hexagonal boron nitride (h-BN) (high-purity reagent manufactured by Alfa Aesar, A Johnson Matthey Company) was added as inorganic particles having a layered hexagonal crystal structure. The silica sol solution to which the aluminum dihydrogen phosphate solution and hexagonal boron nitride (h-BN) had been added was stirred with a magnetic stirrer for 30 minutes to produce a pores-sealing solution (mixed solution). A member for a molten metal bath of Example 4 was obtained in the same methods as those in Example 1 except that this pores-sealing solution was used. The mean particle diameter (median diameter) of h-BN was 2 μm. The average thickness of the pores-sealing coating film was 15 μm.

Example 5

100 g of a silica sol solution containing 20 g of silica ($SiO_2$) (high-purity reagent manufactured by Nissan Chemical Corporation) was prepared. 41 g of an aluminum dihydrogen phosphate solution (high-purity reagent, manufactured by Taki Chemical Co., Ltd.) which was a mixture of 25 g of water and 16 g of aluminum dihydrogen phosphate ($Al(H_2PO_4)_3$) was prepared. To 100 g of the silica sol solution, 41 g of the aluminum dihydrogen phosphate solution was added, and 12.5 g of graphite (manufactured by FUJIFILM Wako Pure Chemical Corporation) was added as inorganic particles having a layered hexagonal crystal structure. The silica sol solution to which the aluminum dihydrogen phosphate solution and graphite had been added was stirred with a magnetic stirrer for 30 minutes to produce a pores-sealing solution(mixed solution). A member for a molten metal bath of Example 5 was obtained in the same methods as those in Example 1 except that this pores-sealing solution was used. The mean particle diameter (median diameter) of graphite was 2 μm. The average thickness of the pores-sealing coating film was 15 μm.

Example 6

A member for a molten metal bath of Example 6 was obtained in the same methods as those in Example 1 except that 32.4 g of aluminum dihydrogen phosphate ($Al(H_2PO_4)_3$) was used instead of 10 g of aluminum dihydrogen phosphate ($Al(H_2PO_4)_3$). The average thickness of the pores-sealing coating film was 10 μm.

Example 7

A member for a molten metal bath of Example 7 was obtained in the same methods as those in Example 1 except that 3.6 g of aluminum dihydrogen phosphate ($Al(H_2PO_4)_3$) was used instead of 10 g of aluminum dihydrogen phosphate ($Al(H_2PO_4)_3$). The average thickness of the pores-sealing coating film was 10 μm.

Example 8

A member for a molten metal bath of Example 8 was obtained in the same methods as those in Example 1 except that 1.4 g of hexagonal boron nitride (h-BN) (high-purity reagent manufactured by Alfa Aesar, A Johnson Matthey Company) was used instead of 6.25 g of h-BN (high-purity reagent manufactured by Alfa Aesar, A Johnson Matthey Company). The average thickness of the pores-sealing coating film was 10 μm.

Example 9

A member for a molten metal bath of Example 9 was obtained in the same methods as those in Example 1 except that 48 g of hexagonal boron nitride (h-BN) (high-purity reagent manufactured by Alfa Aesar, A Johnson Matthey Company) was used instead of 6.25 g of h-BN (high-purity reagent manufactured by Alfa Aesar, A Johnson Matthey Company). The average thickness of the pores-sealing coating film was 10 μm.

Example 10

A member for a molten metal bath of Example 10 was obtained in the same methods as those in Example 1 except that 16.68 g of hexagonal boron nitride (h-BN) (high-purity reagent manufactured by Alfa Aesar, A Johnson Matthey Company) was used instead of 6.25 g of h-BN (high-purity reagent manufactured by Alfa Aesar, A Johnson Matthey Company). The average thickness of the pores-sealing coating film was 10 μm.

Example 11

A member for a molten metal bath of Example 11 was obtained in the same methods as those in Example 1 except that 23.82 g of hexagonal boron nitride (h-BN) (high-purity reagent manufactured by Alfa Aesar, A Johnson Matthey Company) was used instead of 6.25 g of h-BN (high-purity reagent manufactured by Alfa Aesar, A Johnson Matthey Company). The average thickness of the pores-sealing coating film was 10 μm.

Example 12

A member for a molten metal bath of Example 12 was obtained in the same methods as those in Example 1 except that 33.75 g of hexagonal boron nitride (h-BN) (high-purity reagent manufactured by Alfa Aesar, A Johnson Matthey Company) was used instead of 6.25 g of h-BN (high-purity reagent manufactured by Alfa Aesar, A Johnson Matthey Company). The average thickness of the pores-sealing coating film was 10 μm.

Comparative Example 1

100 g of a silica sol solution containing 30 g of silica ($SiO_2$) (high-purity reagent manufactured by Nissan Chemical Corporation) was prepared. 35 g of an aluminum dihydrogen phosphate solution (high-purity reagent, manufactured by Taki Chemical Co., Ltd.) which was a mixture of 25 g of water and 10 g of aluminum dihydrogen phosphate ($Al(H_2PO_4)_3$) was prepared. To 100 g of the silica sol solution, 35 g of the aluminum dihydrogen phosphate solution was added to form a mixed solution. A member for a molten metal bath of Comparative Example 1 was obtained in the same methods as those in Example 1 except that this mixed solution was sprayed for application instead of the pores-sealing solution. The average thickness of the pores-sealing coating film was 10 μm.

Comparative Example 2

100 g of a silica sol solution containing 30 g of silica ($SiO_2$) (high-purity reagent manufactured by Nissan Chemical Corporation) was prepared. 40 g of an aluminum dihydrogen phosphate solution (high-purity reagent, manufactured by Taki Chemical Co., Ltd.) which was a mixture of 25 g of water and 15 g of aluminum dihydrogen phosphate was prepared. To 100 g of the silica sol solution, 40 g of the aluminum dihydrogen phosphate solution was added to form a mixed solution. A member for a molten metal bath of Comparative Example 2 was obtained in the same methods as those in Example 1 except that this mixed solution was sprayed for application instead of the pores-sealing solution. The average thickness of the pores-sealing coating film was 10 μm.

Comparative Example 3

100 g of a silica sol solution containing 30 g of silica ($SiO_2$) (high-purity reagent manufactured by Nissan Chemical Corporation) was prepared. 32 g of an aluminum dihydrogen phosphate solution (high-purity reagent, manufactured by Taki Chemical Co., Ltd.) which was a mixture of 25 g of water and 7 g of aluminum dihydrogen phosphate was prepared. To 100 g of the silica sol solution, 32 g of the aluminum dihydrogen phosphate solution was added to form a mixed solution. A member for a molten metal bath of Comparative Example 3 was obtained in the same methods as those in Example 1 except that this mixed solution was sprayed for application instead of the pores-sealing solution. The average thickness of the pores-sealing coating film was 10 μm.

Comparative Example 4

A member for a molten metal bath of Comparative Example 4 was obtained in the same methods as those in Example 1 except that a slurry obtained by mixing 30 g of silica ($SiO_2$) with 70 g of water was used instead of the silica sol solution used in Example 1. The average thickness of the pores-sealing coating film was 10 μm. Note that silica did not form colloidal particles in the slurry.

Comparative Example 5

A member for a molten metal bath of Comparative Example 5 was obtained in the same methods as those in Example 1 except that 6.25 g of alumina ($Al_2O_3$) having a median diameter of 2 μm was used instead of hexagonal boron nitride (h-BN) used in Example 1. The average thickness of the pores-sealing coating film was 10 μm.

Comparative Example 6

A member for a molten metal bath of Comparative Example 6 was obtained in the same methods as those in Example 1 except that 6.25 g of cubic boron nitride (c-BN) having a median diameter of 2 μm was used instead of hexagonal boron nitride (h-BN) used in Example 1. The average thickness of the pores-sealing coating film was 10 μm.

The compositions of the solution applied to the thermal spray coating films in Examples 1 to 12 and Comparative Examples 1 to 6, the ratio (parts by mass) of aluminum dihydrogen phosphate to 100 parts by mass of silica ($SiO_2$) contained in the silica sol solution (hereinafter also referred to as "$Al(H_2PO_4)_3/SiO_2$"), and the ratio (parts by mass) of the inorganic particles to 100 parts by mass of the mixed solution (hereinafter also referred to as "inorganic particles/mixed solution") are shown in Tables 1 and 2.

TABLE 1

| | | | Example | | | | | | | | | | | |
|---|---|---|---|---|---|---|---|---|---|---|---|---|---|---|
| | | | 1 | 2 | 3 | 4 | 5 | 6 | 7 | 8 | 9 | 10 | 11 | 12 |
| Pores-sealing Solution | Silica Sol Solution | $SiO_2$ (g) | 40 | 45 | 30 | 25 | 20 | 40 | 40 | 40 | 40 | 40 | 40 | 40 |
| | | Solvent and the like excepting $SiO_2$ (g) | 60 | 55 | 70 | 75 | 80 | 60 | 60 | 60 | 60 | 60 | 60 | 60 |
| | Aluminum Dihydrogen Phosphate Solution | $Al(H_2PO_4)_3$ (g) | 10 | 10 | 10 | 10 | 16 | 32.4 | 3.6 | 10 | 10 | 10 | 10 | 10 |
| | | $H_2O$ (g) | 25 | 10 | 15 | 17 | 25 | 25 | 25 | 25 | 25 | 25 | 25 | 25 |
| | Inorganic Particles | h-BN (g) | 6.25 | — | — | 12.5 | — | 6.25 | 6.25 | 1.4 | 48 | 16.68 | 23.82 | 33.75 |
| | | Graphite (g) | — | 6.25 | — | — | 12.5 | — | — | — | — | — | — | — |
| | | $MoS_2$ (g) | — | — | 6.25 | — | — | — | — | — | — | — | — | — |
| | | $Al_2O_3$ (g) | — | — | — | — | — | — | — | — | — | — | — | — |
| | | c-BN (g) | — | — | — | — | — | — | — | — | — | — | — | — |
| $Al(H_2PO_4)_3/SiO_2$ (Parts by mass) | | | 25.00 | 22.22 | 33.33 | 40.00 | 80.00 | 81.00 | 9.00 | 25.00 | 25.00 | 25.00 | 25.00 | 25.00 |
| Inorganic Particles/Mixed Solution (Parts by mass) | | | 4.42 | 4.95 | 4.76 | 8.96 | 8.14 | 3.82 | 4.63 | 1.03 | 26.23 | 11.0 | 15.0 | 20.0 |

TABLE 2

| | | | Comparative Example | | | | | |
|---|---|---|---|---|---|---|---|---|
| | | | 1 | 2 | 3 | 4 | 5 | 6 |
| Pores-sealing Solution | Silica Sol Solution | $SiO_2$ (g) | 30 | 30 | 30 | — | 40 | 40 |
| | | Solvent and the like excepting $SiO_2$ (g) | 70 | 70 | 70 | — | 60 | 60 |
| | Aluminum Dihydrogen Phosphate Solution | $Al(H_2PO_4)_3$ (g) | 10 | 15 | 7 | 10 | 10 | 10 |
| | | $H_2O$ (g) | 25 | 25 | 25 | 25 | 25 | 25 |
| | Inorganic Particles | h-BN (g) | — | — | — | 6.25 | — | — |
| | | Graphite (g) | — | — | — | — | — | — |
| | | $MoS_2$ (g) | — | — | — | — | — | — |
| | | $Al_2O_3$ (g) | — | — | — | — | 6.25 | — |
| | | c-BN (g) | — | — | — | — | — | 6.25 |
| | Slurry | $SiO_2$ (g) | — | — | — | 30 | — | — |
| | | $H_2O$ (g) | — | — | — | 70 | — | — |
| $Al(H_2PO_4)_3/SiO_2$ (Parts by mass) | | | 33.33 | 50.00 | 23.33 | — | 25.00 | 25.00 |
| Inorganic Particles/Mixed Solution (Parts by mass) | | | — | — | — | 4.42 | 4.42 | 4.42 |

(Pore Evaluation Test)

Optical microscope images (photographs) of arbitrary portions of the surface of a member for a molten metal bath were obtained by using an optical microscope set at a magnification of 200 times for each of the members for a molten metal bath of Examples and Comparative Examples. The number of pores in the pores-sealing coating film was measured using the obtained images, and the pores were evaluated according to the following evaluation criteria.
A: No pores were observed
B: Pores were observed in a part of the pores-sealing coating film.
C: Pores were observed in about half of the pores-sealing coating film.
D: Pores were observed almost entirely in the pores-sealing coating film.

(Microcrack Evaluation Test)

Optical microscope images (photographs) were obtained in the same manner as in the pore evaluation test. Using these images, the number of micro cracks was measured, and the micro cracks were evaluated according to the following evaluation criteria.
A: No micro cracks were observed.
B: Micro cracks were observed in a part of the pores-sealing coating film.
C: Micro cracks were observed in about half of the pores-sealing coating film.
D: Micro cracks were observed almost entirely in the pores-sealing coating film.

Figure 2:
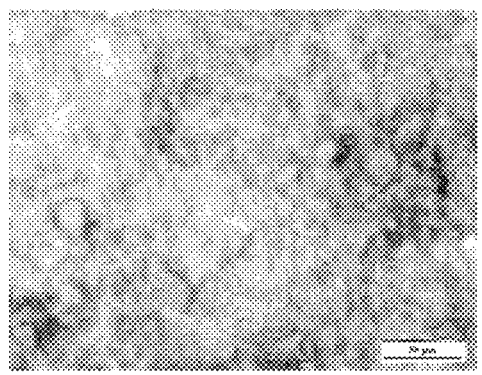
FIG. 2 is an optical microscope image of a member for a molten metal bath of Example 1.
Figure 3:
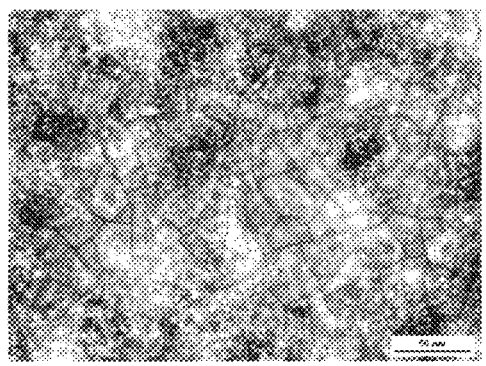
FIG. 3 is an optical microscope image of a member for a molten metal bath of Comparative Example 2.

The images obtained in the above-described evaluations of Example 1 and Comparative Example 2 are shown in FIG. 2 (Example 1) and FIG. 3 (Comparative Example 2).

(Alloy Adhesion Evaluation Test, Alloy Removal Evaluation Test, Molten Metal Permeability Evaluation Test)

The members for a molten metal bath of Examples and Comparative Examples were each immersed in a molten zinc bath, to which 0.1% (mass fraction) of Al had been added, at 450° C. for 30 days. After 30 days, the members for a molten metal bath were pulled up from the molten zinc bath, and the members for a molten metal bath were each subjected to evaluation tests for alloy adhesion, alloy removal property, and molten metal permeability. Further, the molten metal permeability evaluation test was also conducted on the members for a molten metal bath of Examples and Comparative Examples, which were immersed in molten zinc under the above-mentioned conditions for 90 days, in addition to the members for a molten metal bath of Examples and Comparative Examples, which were immersed in molten zinc for 30 days.

In the alloy adhesion evaluation test, whether or not an alloy such as dross adhered to the surface of each of the members for a molten metal bath of Examples and Comparative Examples, and if it adhered, the amount of adhesion was visually confirmed. The evaluation criteria are as follows.
A: No alloy adhered to the surface of the member for a molten metal bath
B: Alloy adhered to a part (several places) of the surface of the member for a molten metal bath.
C: Alloy adhered to half of the surface of the member for a molten metal bath.
D: Alloy adhered to almost the entire surface of the member for a molten metal bath.

The alloy removal evaluation test evaluated the removability of the alloy adhering to the surface of each of the members for a molten metal bath of Examples and Comparative Examples. The evaluation method was performed on the basis of the easiness of removal when an alloy such as dross adhering to the surface of the sample was removed by grasping with tweezers. The evaluation criteria are as follows.
A: All the alloy adhering to the member for a molten metal bath could be removed.
B: Some portions of the alloy adhering to the member for a molten metal bath could not be removed.
C: Most portions of the alloy adhering to the member for a molten metal bath could not be removed.
D: All portions of the alloy adhering to the member for a molten metal bath could not be removed.

In the molten metal permeability evaluation test, each of the members for a molten metal bath of Examples and Comparative Examples pulled up from the molten zinc bath was cut by a high-speed cutting machine, and the degree of permeation of zinc was evaluated by observing the cross section by a scanning electron microscope (SEM) and an energy dispersive X-ray analysis (EDS) apparatus. The evaluation criteria are as follows.
A: Zinc did not permeate into the pores-sealing coating film.
B: Zinc had permeated into the pores-sealing coating film, but not into the thermal spray coating film.
C: Zinc had permeated into the thermal spray coating film, but had not reached the base material.

D: Zinc had permeated inside the thermal spray coating film and reached the base material.

Figure 4:
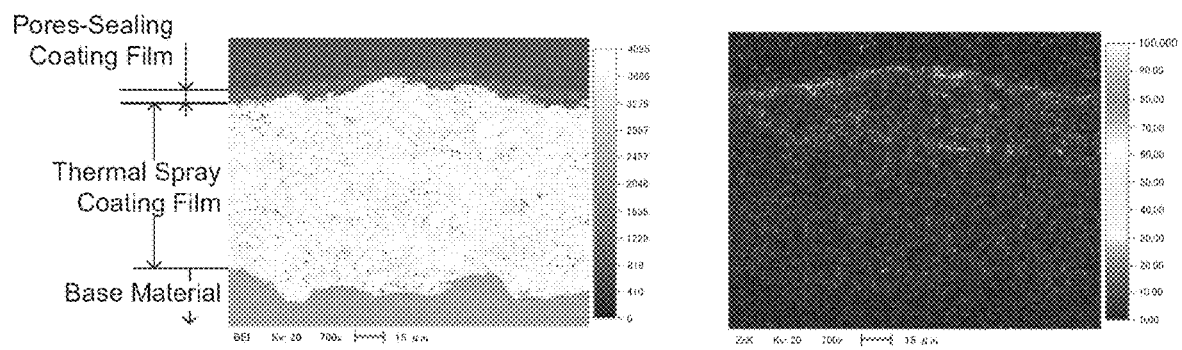
FIG. 4 is a scanning electron microscope image and an energy dispersive X-ray analysis image of the member for a molten metal bath of Example 1.
Figure 5:
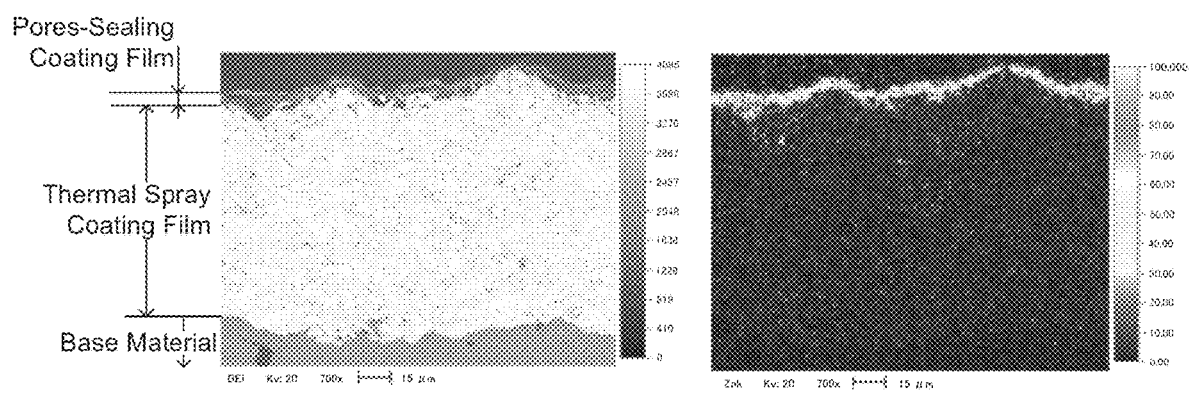
FIG. 5 is a scanning electron microscope image and an energy dispersive X-ray analysis image of a member for a molten metal bath of Example 5.

Scanning electron microscope images (SEM images) and energy dispersive X-ray analysis images (EDS images) of Examples 1 and 5 after immersion in a molten zinc bath for 30 days are shown in FIG. 4 (Example 1) and FIG. 5 (Example 5). In Comparative Examples, the results were that the thermal spray coating film was melted and damaged after immersion.

The above-described evaluation test results are shown in Table 3.

mal spray coating film in Examples 1 to 12 as compared with Comparative Examples 1 to 6.

Further, in Examples 1, 4 and 6 to 12 in which hexagonal boron nitride (h-BN) was used as the inorganic particles, alloys such as dross were less likely to be attached as compared with Examples 2, 3 and 5 in which molybdenum disulfide ($MoS_2$) or graphite was used as the inorganic particles. From this result, it can be understood that the use of h-BN as the inorganic particles makes the alloy such as dross less likely to adhere.

TABLE 3

| | | Pore | Micro Cracks | Alloy Adhesion Property | Alloy Removal Property | permeability of Molten Metal 30 days | 90 days |
|---|---|---|---|---|---|---|---|
| Example | 1 | A | A | A | — | A | A |
| | 2 | A | A | B | A | A | A |
| | 3 | A | A | B | A | A | A |
| | 4 | A | A | A | — | A | A |
| | 5 | A | A | B | A | B | B |
| | 6 | B | A | A | — | A | A |
| | 7 | A | A | A | — | B | B |
| | 8 | A | B | A | — | A | A |
| | 9 | A | A | A | — | A | D |
| | 10 | A | A | A | — | A | D |
| | 11 | A | A | A | — | A | D |
| | 12 | A | A | A | — | B | D |
| Comparative Example | 1 | C | D | D | C | D | D |
| | 2 | C | D | D | C | D | D |
| | 3 | C | D | D | C | D | D |
| | 4 | D | C | C | C | D | D |
| | 5 | C | C | C | C | D | D |
| | 6 | D | C | D | C | D | D |

From the above-described results, the evaluation results of Examples 1 to 12 were A or B for any of the evaluation items of the pore evaluation, the microcrack evaluation, the alloy adhesion evaluation, and the alloy removal evaluation. On the other hand, the evaluations of Comparative Examples 1 to 6 were C or D for any of the evaluation items of the pore evaluation, the microcrack evaluation, the alloy adhesion evaluation, and the alloy removal evaluation. From these evaluation results, it can be understood that according to the method for producing the members for a molten metal bath of Examples 1 to 12, it is possible to provide a method for producing a member for a molten metal bath which is less likely to form micro cracks and pores in the pores-sealing coating film, and to provide a method for producing a member for a molten metal bath which can restrain the adhesion of an alloy such as dross. In addition, it can be understood that slip flaws, pushing flaws, and the like are less likely to be formed on a steel strip (steel sheet) to be plated by using the members for a molten metal bath of Examples 1 to 12.

In addition, the evaluation results of the molten metal permeability evaluation in Examples 1 to 12 in the case of immersion in molten zinc for 30 days were A or B. In particular, in Examples 1 to 8, the evaluation results of the molten metal permeability evaluation in the case of immersion in molten zinc for 90 days were A or B. On the other hand, in Comparative Examples 1 to 6, both the evaluation results of the molten metal permeability in the case of immersion in molten zinc for 30 days and the evaluation results of the molten metal permeability in the case of immersion in molten zinc for 90 days were D. From these results, it can be understood that molten metal is less likely to permeate into the pores-sealing coating film or the ther- Further, in Examples 1 to 5 and 8 to 12 in which the ratio of $Al(H_2PO_4)_3/SiO_2$ fell within the range of 10 (parts by mass) or more and 80 (parts by mass) or less, pores were less likely to be formed in the pores-sealing coating film as compared with Example 6 in which the ratio of $Al(H_2PO_4)_3/SiO_2$ exceeded 80 (parts by mass). Further, in Examples 1 to 4 and 8 to 11 in which the ratio of $Al(H_2PO_4)_3/SiO_2$ fell within the range of 10 (parts by mass) or more and 80 (parts by mass) or less, the resistance to permeation of molten metal in the case of immersion in molten zinc for 30 days was further improved as compared with Example 7 in which the ratio of $Al(H_2PO_4)_3/SiO_2$ was less than 10 (parts by mass). From this result, it can be understood that when the ratio of $Al(H_2PO_4)_3/SiO_2$ is 10 (parts by mass) or more and 80 (parts by mass) or less, pores are less likely to be formed in the pores-sealing coating film, and the resistance to permeation of molten metal in the case of immersion in molten zinc for 30 days can be further improved.

In Examples 1 to 7 and 10 to 12 in which the ratio of inorganic particle/mixed solution fell within the range of 2 (parts by mass) or more and 25 (parts by mass) or less, micro cracks were less likely to be formed as compared with Example 8 in which the ratio of inorganic particle/mixed solution was less than 2 (parts by mass). In Example 9 in which the ratio of inorganic particle/mixed solution exceeded 25 (parts by mass), it was confirmed that part of the pores-sealing coating film dropped off after immersion in the molten zinc bath for 30 days. On the contrary, in Examples 1 to 7 and 10 to 12 in which the ratio of inorganic particle/mixed solution fell within the range of 2 (parts by mass) or more and 25 (parts by mass) or less, it was not possible to confirm the dropping-off of the pores-sealing coating film at all. From this result, it can be understood that when the ratio of inorganic particle/mixed solution is set to 2 (parts by mass) or more and 25 (parts by mass) or less, micro cracks are less likely to be formed and the strength of the pores-sealing coating film 13 can be further improved.

Further, in Examples 1 to 7 in which the ratio of inorganic particle/mixed solution fell within the range of 2 (parts by mass) or more and 10 (parts by mass) or less, even when the members were immersed in a molten zinc bath for 90 days, the dropping-off of the pores-sealing coating film could not be confirmed at all, and the evaluation results of the molten metal permeability evaluation test (90 days) was A or B. On the other hand, in Examples 9 to 12 in which the ratio of inorganic particle/mixed solution exceeded 10 (parts by mass), it was confirmed that a part of the pores-sealing coating film dropped off after the members were immersed in a molten zinc bath for 90 days, and thus the evaluation result of the molten metal permeability evaluation test (90 days) was D. From this result, it can be understood that when the ratio of inorganic particle/mixed solution is set to 2 (parts by mass) or more and 10 (parts by mass) or less, the strength of the pores-sealing coating film can be maintained in an improved state as compared with the case where the ratio of inorganic particle/mixed solution exceeds 10 (parts by mass), and the dropping-off of the pores-sealing coating film can be restrained for a longer period of time. In addition, it can also be understood that the molten metal is less likely to permeate into the thermal spray coating film or the pores-sealing coating film from the dropping-off portion of the pores-sealing coating film, and that the permeation of the molten metal into the thermal spray coating film or the pores-sealing coating film can be restrained for a longer period of time.

REFERENCE SIGNS LIST 1 member for a molten metal bath
11 base material
12 thermal spray coating film
13 pores-sealing coating film
14 inorganic particles

The invention claimed is:

1. A method for producing a member for a molten metal bath which is used by being immersed in molten metal, comprising:
 applying or spraying, to a cermet thermal spray coating film formed on a base material or an oxide-based ceramic thermal spray coating film formed on a base material, a mixed solution obtained by adding aluminum dihydrogen phosphate and inorganic particles having a layered hexagonal crystal structure to a silica sol solution as a solution for sealing pores of the thermal spray coating film, and
 firing the mixed solution which is applied or sprayed to the thermal spray coating film, wherein
 the inorganic particles are added in an amount of 2 parts by mass or more and 10 parts by mass or less to 100 parts by mass of the mixed solution, and
 the aluminum dihydrogen phosphate is added in an amount of 10 parts by mass or more and 25 parts by mass or less to 100 parts by mass of silica contained in the silica sol solution.

2. The method for producing a member for a molten metal bath according to claim 1, wherein the inorganic particles are hexagonal boron nitride.

3. The method for producing a member for a molten metal bath according to any one of claim 1, wherein the inorganic particles have an average particle diameter of 0.1 μm or more and 5 μm or less.

4. The method for producing a member for a molten metal bath according to claim 1, wherein the cermet thermal spray coating film is any of a WC-WB-Co-based cermet thermal spray coating film, a WB-Co-based cermet thermal spray coating film, and a WC-Co-based cermet thermal spray coating film.

5. The method for producing a member for a molten metal bath according to claim 1, wherein the oxide-based ceramic thermal spray coating film is a thermal spray coating film of an oxide of at least one element selected from the group consisting of Y, Ce, Er, Zr, and Cr.

6. The method for producing a member for a molten metal bath according to claim 1, wherein the aluminum dihydrogen phosphate is added to the silica sol solution as a gelation initiator, and the aluminum dihydrogen phosphate causes crystal transition of silica contained in silica colloidal particles by firing the mixed solution.

7. The method for producing a member for a molten metal bath according to claim 6, wherein the inorganic particles prevent movement of a liquid phase in a process of gelling on firing the mixed solution and restrain reduction of a volume of the mixed solution.

8. The method for producing a member for a molten metal bath according to claim 1, wherein a mass fraction of the silica in the silica sol solution is 20% or more and 45% or less.

9. The method for producing a member for a molten metal bath according to claim 1, wherein the silica colloidal particles contained in the silica sol solution have an average particle diameter of 50 nm or less.

10. The method for producing a member for a molten metal bath according to claim 1, wherein the inorganic particles are graphite and/or molybdenum disulfide.

\* \* \* \* \*